Aug. 31, 1926.
J. J. LA DUCER
1,598,202
PROFILING MACHINE
Filed Oct. 26, 1922      3 Sheets-Sheet 1
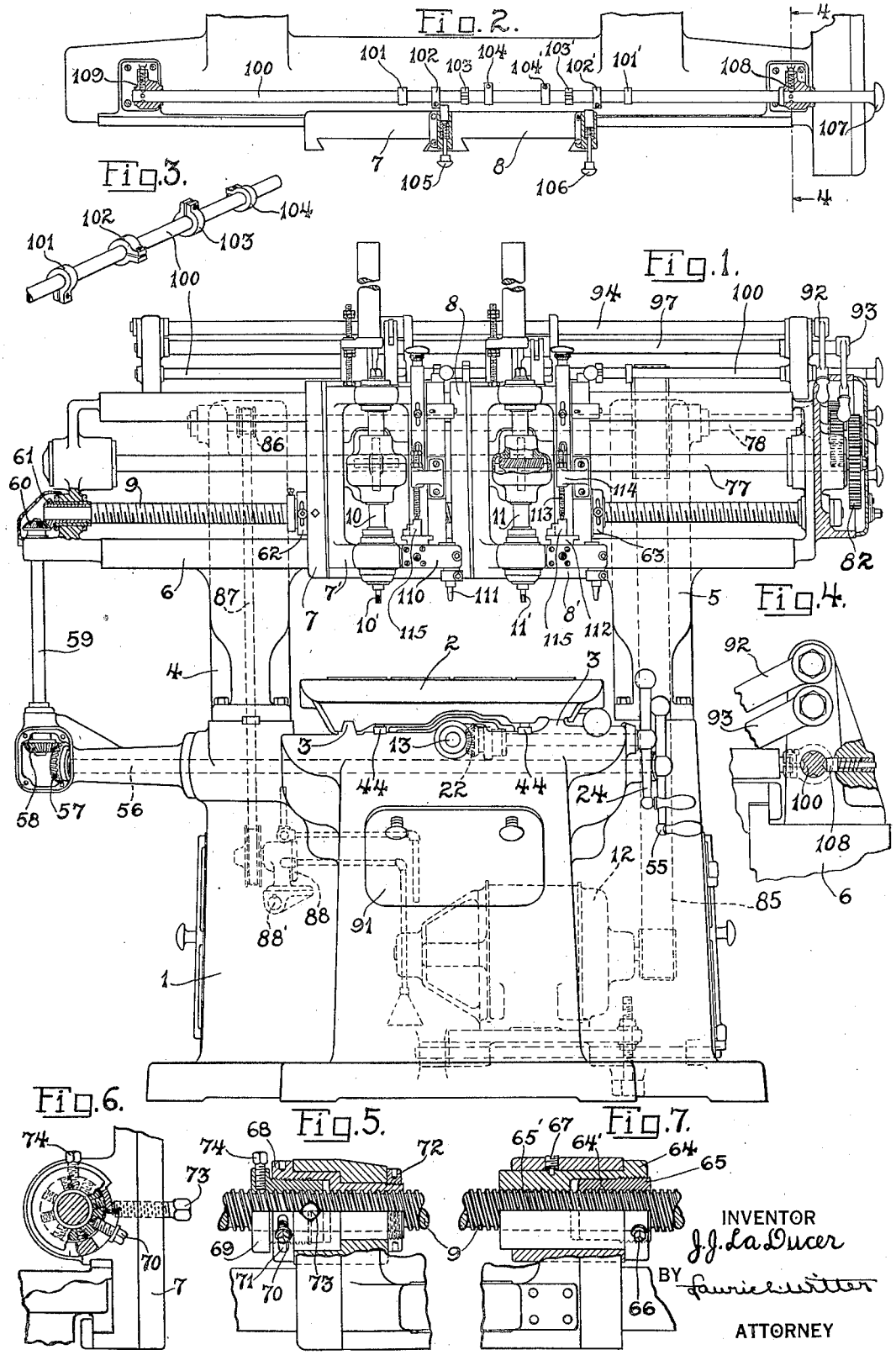

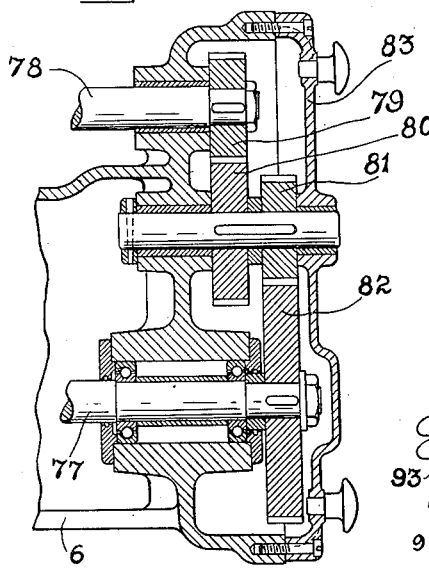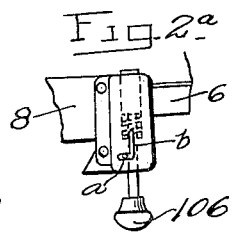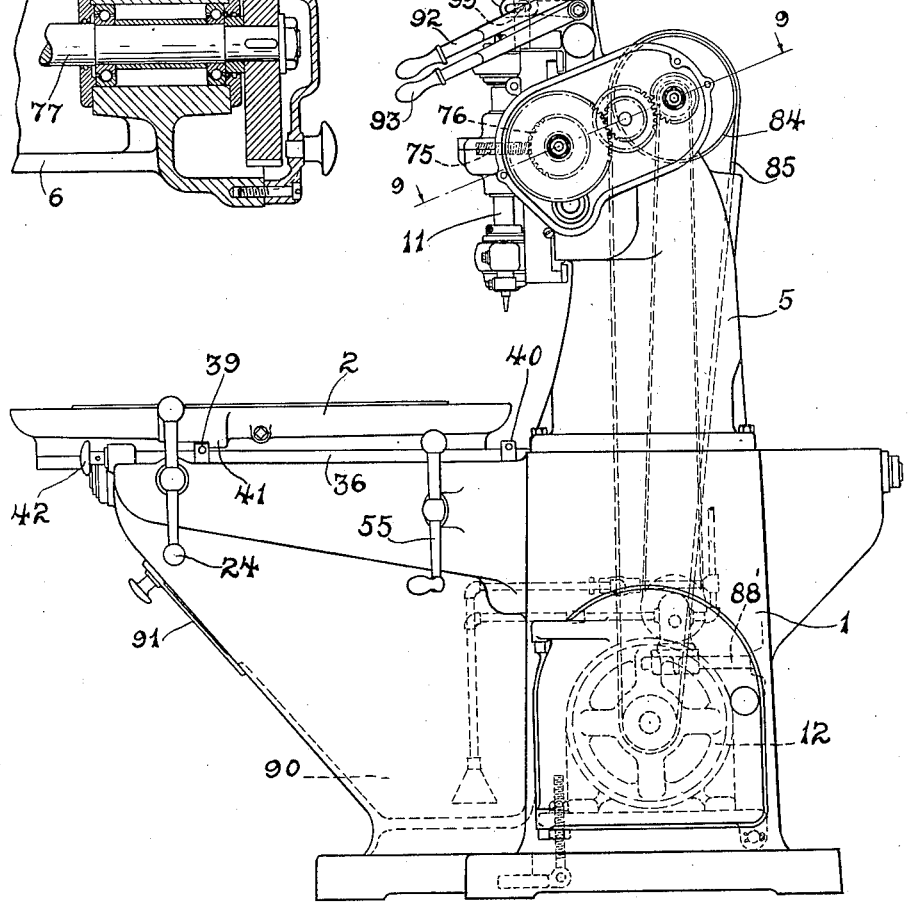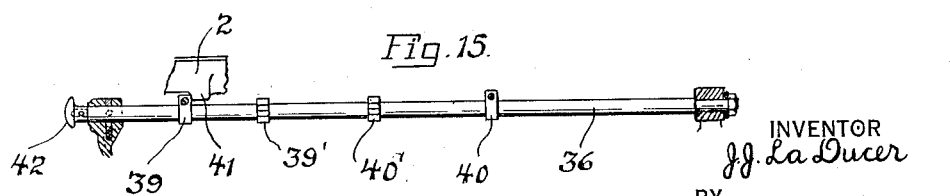

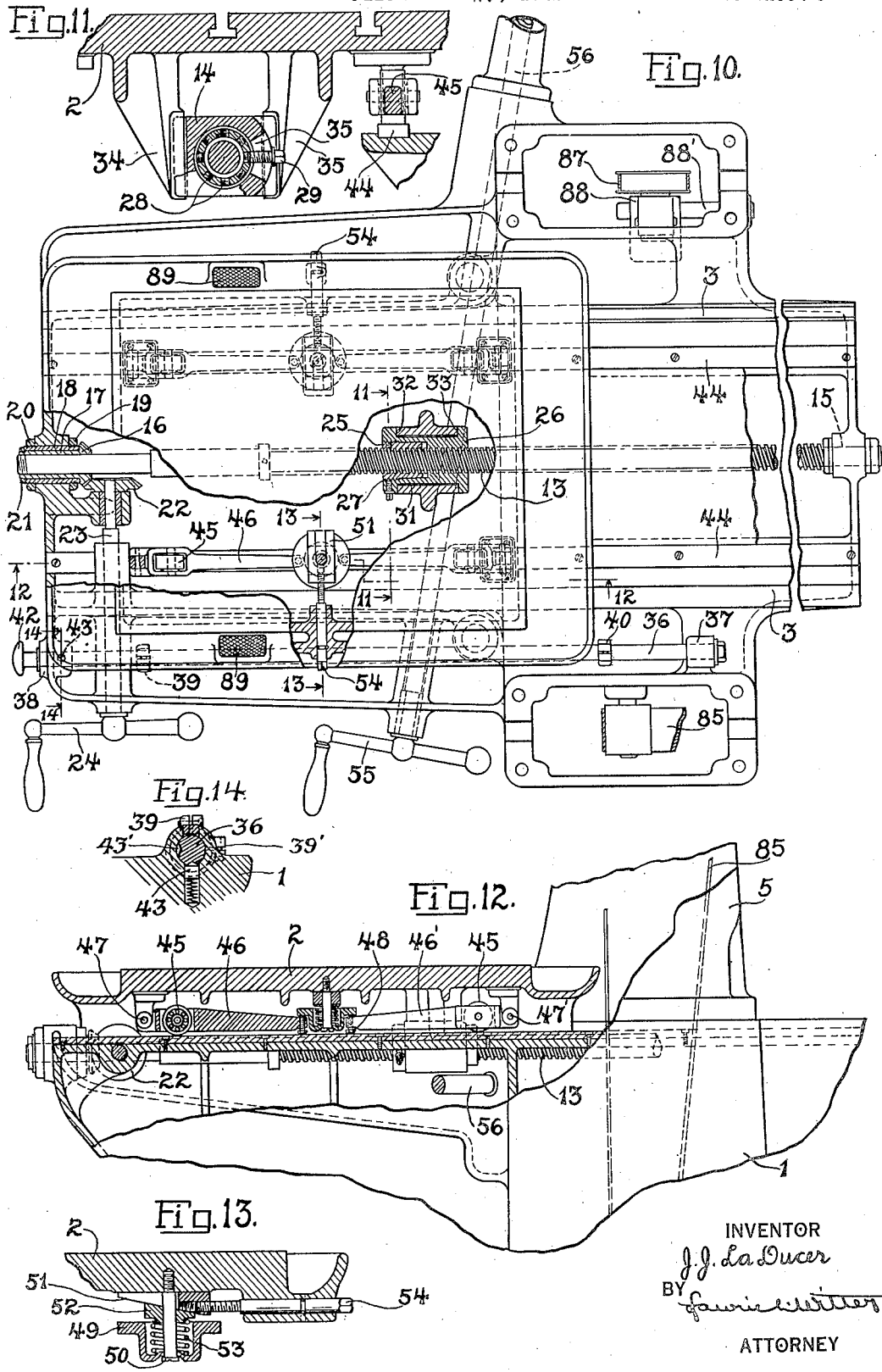

Patented Aug. 31, 1926.

1,598,202

UNITED STATES PATENT OFFICE.

JERRY J. LA DUCER, OF HARTFORD, CONNECTICUT, ASSIGNOR TO PRATT & WHITNEY COMPANY, OF NEW YORK, N. Y., A CORPORATION OF NEW JERSEY.

PROFILING MACHINE.

Application filed October 26, 1922. Serial No. 597,229.

This invention relates especially to profiling machines. Such a machine of the type illustrated in the accompanying drawings broadly comprises a base, a work table slidably mounted thereon, a cross rail supported on the base over the table, one or a plurality of tool spindle supports slidable on the cross rail, means for rotating the tool spindles, and means for moving the work table and tool supports horizontally and the tool spindles vertically. The primary object of the present invention is to provide a machine of this type embodying several and various improvements.

It is an object of the invention to provide improved means for lessening the load of the work table on its ways thereby rendering the table more easily operated, means being operative from beneath the table for adjusting the first named means.

It is an object of the invention to provide, in a machine of the type stated, improved means for moving the tool supports on the cross rail, such means comprising a screw extending along the rail and threadedly engaging both supports to move the same simultaneously along the rail and novel means including a handle conveniently located for rotating the screw.

Another object of the invention is to provide an improved arrangement of spindle operating means, such means including handles located on one end of the cross rail for moving the cutter spindles vertically.

A further object of the invention is to provide improved adjustable means including a plurality of pairs of stops on a rotary stop rod for limiting the operative movements of the tool spindle supporting saddles along the cross rail.

Another object of the invention is to provide an improved connection between the tool supports and work table and their operating screws, such connection comprising an adjustable compound nut in connection with each of the tool supports and the work table and their operating screws whereby such elements may be maintained in accurate screw threaded engagement.

A further object of the invention is to provide means in connection with one of the said compound nuts whereby such nut may be secured against rotation either relative to the screw or to the tool support, a relative adjustment of the supports along the rail being accomplished by this mechanism.

Another object of the invention is to provide improved means for driving a lubricant pump and for rotating the cutter spindles in any position along the rail, such means including a driving pulley so located as to be driven either from a motor in the base of the machine or from an overhead countershaft and means including change gears connecting the pulley with the spindles.

Other improvements comprising objects of the invention include adjustably mounted bevel gears whereby lost motion may be taken up in the tool support and work table operating mechanisms and improved means for floatingly mounting the table operating nut whereby the same rides freely on its operating screw at all times.

With the above and other objects in view, my invention consists in the features of construction and operation set forth in the following specification and illustrated in the accompanying drawings. In such drawings annexed hereto and forming a part of this specification, I have shown my invention embodied in a profiling machine but it will be understood that the invention can be otherwise embodied and that the drawings are not to be construed as defining or limiting the scope of the invention, the claims appended to this specification being relied upon for that purpose.

Referring to the figures of the drawings:

Figure 1 is a front elevation of a profiling machine embodying the improvements comprising my invention.

Fig. 2 is a fragmentary plan view thereof.

Fig. 2ᵃ is a fragmentary detail view.

Fig. 3 is a fragmentary perspective view of a portion of Fig. 2.

Fig. 4 is an end view of the cross rail, partially in section on line 4—4 of Fig. 2.

Fig. 5 is an elevation, partially in section, of a compound nut mounted in one of the tool supports and cooperating with the cross rail screw for moving such tool support along the cross rail.

Fig. 6 is an end view thereof partially in section.

Fig. 7 is an elevation partially in section of a compound nut mounted in the other tool support.

Fig. 8 is a side elevation of the machine shown in Fig. 1.

Fig. 9 is an enlarged sectional view taken on line 9—9 of Fig. 8 and showing change gears comprising a portion of the tool spindle driving mechanism.

Fig. 10 is a plan view of the base of the machine with the table mounted thereon, certain portions thereof being shown in section.

Fig. 11 is a fragmentary detail view taken on line 11—11 of Fig. 10.

Fig. 12 is a fragmentary sectional view through the table on line 12—12 of Fig. 10.

Fig. 13 is a fragmentary detail view taken approximately on line 13—13 of Fig. 10.

Fig. 14 is a detail view taken on line 14—14 of Fig. 10.

Fig. 15 is a detail view illustrating a modification of the table stop rod.

Referring more specifically to the drawings by reference characters, 1 indicates the base of the machine having a table 2 slidably mounted on horizontal ways 3 thereon. A pair of uprights 4 and 5, respectively bolted to the base at opposite sides of the table, support a cross rail 6 thereon over the table. Two tool spindle supporting saddles 7 and 8 are illustrated as slidably mounted on the rail and movable therealong by means of a screw 9. A pair of tool spindles 10 and 11 are supported vertically in heads 7' and 8' respectively slidable vertically in the saddles 7 and 8, the spindles being adapted to be rotated preferably from a motor 12 in the base and the improved means hereinafter described.

The table 2 is adapted to be moved along its ways by means of a screw 13 threadedly engaging a nut 14 connected to the table and having one end journaled in the base at 15. The screw is adapted to be rotated through a bevel gear 16 on the other end thereof. The bevel gear is provided with an integral sleeve 17 journaled for rotation within a bushing 18 adjustable longitudinally in its bearing support by means of nuts 19 and 20 threaded to the ends thereof. A nut 21 threaded to the end of the sleeve holds the sleeve and bevel gear within the bushing. The bevel gear 16 is rotated from a bevel gear 22 meshing therewith and mounted on one end of a shaft 23 journaled in the frame of the machine and provided with an operating handle 24 at its outer end.

It will be understood that a profiling machine in operation ordinarily works to a pattern and such operation must necessarily be very accurate. One of the objects accomplished in the present invention is the application of certain adjustable features to a profiling machine whereby such machine is rendered extremely accurate in operation. One of these features comprises the peculiar mounting of the bevel gear 16 as just described. The inner end of the bushing 18 holds the bevel gear 16 in the engagement with its cooperating gear 22. The nuts 19 and 20 provide for a fine longitudinal adjustment of the bushing whereby the gear 16 may be adjusted and held in close and accurate engagement with gear 22, thereby preventing any back lash or looseness between such gears. It will be understood that the teeth of these cooperating bevel gears will become worn and loose after considerable operation thereof and such looseness may be accurately taken up at any time by the novel means defined. This adjustment therefore not only serves its purpose in the original setting up of the machine but serves to maintain the original accuracy between the gears.

The nut 14 comprises two parts 25 and 26 both threaded to engage the screw 13 and the part 25 being screw threaded within the part 26 at 27. The inner part 25 is provided with a plurality of tapped holes 28 therearound as shown in Fig. 11, such holes being arranged along the pitch line of the screw thread 27. A tap bolt 29 is adapted to extend through a slot 30 in the nut part 26 and screw into any one of holes 28. In the original set-up of the machine, the nut parts 25 and 26 will be screw threaded together to a relative position to cooperatingly engage the screw 13 as a single nut. The adjustment between the parts 25 and 26 permit not only the accurate original engagement of screw 13 by the nut 14 but as such parts become worn or loose any play or looseness may be accurately taken up by adjusting the part 25 within the part 26, the parts being secured in their adjusted position by means of bolt 29.

It will be noted that opposite sides of the outer part 26 of the nut 14 are provided with plane parallel recesses 31 providing shoulders 32 and 33 on the nut at the ends of such recesses. A pair of elements 34 and 35 depending from the under side of the table 2 are adapted to slidingly engage the nut within these recesses. The nut engaging portions of the elements 34 and 35 accurately engage the shoulders 32 and 33 whereby no longitudinal movement of the nut relative to the table is permitted. The nut is however free for vertical movement within such elements and is permitted a slight horizontal movement therein as illustrated in Figs. 10 and 11. As thus constructed, the nut is substantially floatingly connected to the table for freedom of movement laterally of the screw and is therefore adapted to ride freely along the screw even though the latter should be out of alignment. The accurate engagement of the elements 34 and 35 with the shoulders 32 and 33 however accurately move and hold the carriage positioned relative to the nut longitudinally of the screw.

In performing certain operations, it is desirable that the table should move only between certain fixed limits. For performing this function, I provide a rod 36 secured against longitudinal movement at its ends in bosses 37 and 38 on the machine frame. A pair of stops 39 and 40 adjustably mounted on the rod are provided with laterally projecting portions adapted to be engaged by a projection 41 on the table. It will be noted that the stops may be set to any position on the rod to permit the desired table movement. A knob 42 is provided on the forward end of the rod whereby the same may be rotated to move the projecting portions of the stops out of the path of movement of the table projection 41 when it is desired to give the table unlimited movement. A spring-pressed detent 43 is adapted to engage notches 43' in the rod to hold the rod either in its operative or inoperative position.

In operation, the table must be firmly supported for resisting the thrusts of the tool on the work carried by the table. The table rides on the ways 3 as heretofore described. The weight of the table and its work causes considerable friction and resistance to the sliding movement of the table on its ways in operation. For the purpose of reducing this friction and thereby rendering the table more easily operative, it is proposed to lessen the load of the table on the ways. This function is accomplished by an anti-friction spring counterbalancing mechanism shown in Figs. 10, 12 and 13 and now to be described.

Laterally of and parallel with the ways 3 is a second pair of ways 44 adapted to be engaged by anti-friction rollers 45. Each of these ways 44 and the mechanism cooperating therewith is identical and therefore only one need be described herein. A pair of levers 46 and 46' are pivoted at one end to lugs 47 and 47' secured to the under side of the table. An anti-friction roller 45 is mounted in each lever adjacent its pivoted end, such rollers being adapted to ride on one of the ways 44. Set screws 48 in the free ends of the levers are adapted to engage the flange of a cupped element 49. This element is loosely mounted for vertical sliding movement on a bolt 50 threaded into the bottom of the table. Adjacent the table and straddling the bolt 50 are a pair of cooperating wedge members 51 and 52, the wedge 51 being slidable longitudinally. Between the wedge members and the bottom of the element 49 is interposed a compression spring 53. A bolt 54 journaled into the side of the table is threadedly engaged with the wedge 51 whereby to slide the same longitudinally.

It will be noted that adjustment of the wedge member 51 inwardly operates to press the spring 53 and force the element 49 downwardly. Such force operating on the free ends of the levers 46 and 46' exerts a force upwardly on the table at the pivoted ends of the levers, such weight of the table being then carried by the anti-friction rollers 45 in the levers. The wedge 51 may be adjusted to support most of the table weight on the rollers 45, sufficient weight being left on the ways 3 to keep the table in contact therewith. It will be seen therefore that the greater portion of the weight of the table and its work can be carried on the anti-friction rollers with the table still in contact with its ways 3 to take the thrusts of the tool, most of the friction on the ways 3 thereby being eliminated and the table rendered very sensitive in operation whatever be the load thereon.

For the convenience of the operator, the screw 9 for moving the saddles 7 and 8 along the cross rail is adapted to be rotated from a handle 55 adjacent the table operating handle 24. The handle 55 is mounted on the front end of a shaft 56 extending transversely beneath the table, a bevel gear 57 on the other end of the shaft meshing with a bevel gear 58 on a vertical shaft 59. A bevel gear 60 on the other end of shaft 59 meshes with a bevel gear 61 on the screw 9. The bevel gears 58 and 61 are preferably longitudinally adjustable for taking up lost motion, in the same manner as has heretofore been described in reference to the bevel gear 16.

The screw 9 is threadedly engaged with nuts 62 and 63 respectively mounted in the saddles 7 and 8 whereby both saddles may be moved simultaneously along the cross rail 6, both these nuts comprising two relatively adjustable parts whereby the same may be made to accurately engaged the screw, as the table operating nut 14 heretofore described. The nut 63 is of substantially the same construction as nut 14, the same comprising a part 64 and a second part 65 threaded thereinto and adjustably clamped by a screw 66. Parts 64 and 65 respectively are threaded at 64' and 65' to engage the screw 9. A dowel pin 67 holds the nut 63 non-rotatably in its saddle 8.

The nut 62 comprises an outer portion 68 and an inner portion 69 threaded thereinto and adjustably clamped to part 68 by a bolt 70 extending through a slot 71. This nut is rotatably held within the saddle 7 by means of a nut 72 threaded on one end of part 68. A bolt 73 threaded into the saddle is adapted to engage the part 68 as illustrated in Fig. 6 to hold the nut against rotation within the saddle. Another bolt 74 threaded through the part 69 is adapted to secure the nut against rotation relative to the screw 9.

It is ordinarily desired, when operating the machine, to move both saddles simultaneously by rotating the screw 9. When such operation is desired, the bolt 73 is tightened to secure the nut 62 against rotation relative to the saddle, the bolt 74 being loose at this time. Rotation of the screw 9, with such adjustment, will move the saddles simultaneously and with equal speed along the cross rail. When it is desired to adjust the saddle 8 toward or from the saddle 7, the bolt 73 is loosened and the bolt 74 tightened. This operation secures the nut 62 to the screw 9. Rotation of the screw with this adjustment will move the saddle 8 as usual but will have no effect on the saddle 7. The saddle 7 may be adjusted relative to the saddle 8 by loosening both bolts 73 and 74 and rotating the nut 62 by hand.

The tool spindles 10 and 11 are each provided with a spiral gear 75 splined thereon and in mesh with spiral gears 76 splined to a horizontal shaft 77 at the rear of the cross rail. This shaft 77 is driven from a parallel shaft 78 through gears 79, 80, 81 and 82 in a gear box 83. As seen in Fig. 9, the gears 81 and 82 constitute change gears which may be removed and gears of different sizes substituted in their stead when it is desired to drive the spindles at a different speed. The shaft 78 is mounted on the uprights 4 and 5 and is provided with a pulley 84 so positioned that the same may be operated either from an overhead counter shaft or from a motor in the base, as the motor 12 illustrated as connected to the pulley by a belt 85.

It will be noted that both uprights 4 and 5 are hollow and that the pulley 84 is positioned over the upright 5, the belt 85 extending from the motor 12 to the pulley 84 through this upright. The upright is thereby conveniently utilized as a guard for the belt. A second pulley 86 is mounted on the shaft 78 over the upright 4 and a belt 87 extends from this pulley downwardly through the upright to drive a lubricating pump 88 mounted on a rod 88' in the base of the machine. The lubricating connections from the pump are not completely illustrated in the drawings since the same comprise no part of this invention. In operation, the lubricant flowing from the table 2 drains downwardly through the strainers 89 into a reservoir 90 in the base. A large door 91 at the front of the machine provides easy access to the reservoir.

Vertical movement of the spindles 10 and 11 in operation is accomplished respectively by handles 92 and 93 conveniently located at the end of the cross rail. The handle 92 is mounted on a shaft 94 provided with an arm 95 having a slot and pin connection 96 to the vertically movable spindle-supporting head 7' in the saddle 7. The handle 93 is mounted on a shaft 97 provided with an arm 98 having a slot and pin connection 99 to the vertically movable spindle-supporting head 8' in the saddle 8.

Adjustable stop means have heretofore been described whereby the table may be permitted to move only between certain fixed limits. Means is also provided in connection with the saddles 7 and 8 whereby the same may be moved only between certain fixed limits. This means comprises a rod 100 rotatably supported in bearings at its ends on the cross rail. As shown in Figs. 2 and 3, this rod carries a plurality of pairs of adjustable stops 101 and 101', 102 and 102', 103 and 103', 104 and 104'. Each stop is provided with a radially extending projection thereon and the projections of each pair of stops extend in the same direction. Furthermore the projections on the several pairs of stops are arranged in relatively right angular positions as illustrated. Detents 105 and 106 mounted respectively on saddles 7 and 8 are adapted to cooperate with the stops in the manner hereinafter described. The rod 100 may be rotated by means of a knob 107 to bring the projections of any pair of stops into the path of movement of the detents 105 and 106, spring-pressed detents 108 and 109 being provided to hold the rod in any one of its four positions. Detents 105 and 106 may be moved longitudinally into or out of the path of engagement of the stops as illustrated in Figs. 2 and 2ª. The shank of each detent 105 and 106 carries a pin $a$ engaging in an L-shaped slot $b$. Each detent is normally spring pressed to its operative position and the same can be withdrawn to the inoperative position and held therein by rotating the shank to engage the pin $a$ in the right angular portion of the slot $b$, as indicated in Fig. 2ª. The stops for limiting the table movement in connection with the stops for limiting the movement of the tool supports provides a combination particularly useful in profiling machines. Cutting operations often require great accuracy in milling close up to a shoulder or other portion of a work piece. By limiting the movement of the tool in two directions and limiting the movement of the work in other two directions at right angles to the movement of the tool, the tool may be made to operate over only a definite portion of the work piece or pieces.

It should be understood that if desired, the table stop rod 36 may also be provided with a plurality of pairs of stops thereon, as is the stop rod 100 for the tool supports. In Fig. 15 I have illustrated the rod 36 as provided with two pairs of stops 39, 40 and 39', 40'. By rotating the rod, either pair of stops 39, 40 or 39', 40' may be brought into the path of movement of the table lug 41.

Adjacent the tool spindle on each head is removably mounted a former pin block 110 each adapted to support a former pin 111 therein. The former pin in each head is accurately spaced from the tool therein and rigidly secured to the head whereby the tool and former pin must move as a unit. In operation the former pin is adapted to be held in contact with a pattern secured to the table 2 adjacent the work piece whereby the tool is guided to cut the work piece to the shape of the pattern.

In the usual operation of the machine, finishing and roughing tools 10' and 11' respectively are carried by the spindles 10 and 11. The stops on the rod 100 being set to the desired positions, the knob 107 is rotated to bring the pair of stops into position relative to the detents 105 and 106, which correspond to the traversing movement it is desired to give to the saddles in operation, stops 102 and 102' being shown in such position in Fig. 2. The detent 106 is then moved to a position to engage the stops, the detent 105 being in the inoperative position at this time. The saddles may now be moved along the cross rail, as permitted by the detent 106 moving between the stops (102 and 102', as shown in Fig. 2), whereby the saddle 8 with its head 8' and spindle 11 will be traversed over the table to rough cut the work thereon by the roughing tool 11'. After this operation, the detent 106 is withdrawn and the the detent 105 placed in the operative position between the stops. The saddles may now be moved along the rail, as permitted by detent 105 between the stops, and the saddle 7 with its head 7' and spindle 10 will thus be traversed over the table to finish the work thereon by the finishing tool 10'. It will be understood that the finishing tool 10' is spaced the same distance from its former pin 111 as is the roughing tool 11' from its former pin whereby both tools are accurately guided by the pattern in the cutting operations.

In certain operations it is essential that the upward movement of the operating tool be limited by a rigid and positive stop means. This function is accomplished as follows: A gage block supporting anvil 112 is rigidly mounted on each spindle head 7' and 8'. A screw 113 is supported directly above each anvil by being screw threaded into a bearing 114 supported on the adjacent saddles 7 and 8. A gage block 115 of the desired thickness may be mounted on the anvil and the screw 113 may be adjusted as desired. By this means upward movement of the spindles and their tools is positively limited by the gage block between the anvil 112 and screw 113.

It is believed that the operation of the machine will be clear from the above description taken in connection with the accompanying drawings. The several controls for the entire machine are located within easy reach of the operator from his usual position at the righ-hand side of the machine in front of the cross rail. The handles 24 and 55 for respectively moving the table 2 and the saddles 7 and 8 are located on the machine directly in front of the operator from his said usual operating position. Other controlling mechanism for the machine is located on the right end of the cross rail within easy reach of the operator from the said position. It should be understood that the machine illustrated in the accompanying drawings is particularly designed for operating on comparatively large pieces of work and the locating of the several controls in the manner stated above is particularly advantageous and practically essential in such a large machine. The operative connections from the handles 24 and 55, as has been heretofore described, renders the machine capable of extreme accuracy in operation at all times. Furthermore the improved driving means for the spindles is advantageous to the machine in many respects. In brief, the invention taken as an entirety provides an improved profiling machine adapted to perform milling operations of this type more easily and accurately and with greater facility than has been done heretofore.

What I claim is:

1. In a machine of the class described, the combination of a base, a pair of ways thereon, a work table slidable on the ways, a plurality of anti-friction rollers operatively connected to the table and adapted to roll on the base, spring means cooperating with the table and rollers for transmitting a portion of the weight of the table to the said rollers, and means operative from beneath the table for varying the action of the spring means on the rollers whereby to vary the amount of table weight transmitted to the rollers.

2. In a machine of the class described, the combination of a base, a pair of ways thereon, a work table slidable on the ways, a plurality of levers pivoted to the under side of the table, an anti-friction roller mounted in each lever and adapted to roll on the base, spring means cooperating with the table and levers for transmitting a portion of the weight of the table to the said rollers, and means operative from beneath the table for varying the action of the spring means on the levers whereby to vary the amount of table weight transmitted to the rollers.

3. In a machine of the class described, the combination of a base, a pair of ways thereon, a work table slidable on the ways, a second pair of ways adjacent and parallel with the first ways, a pair of levers each pivoted at one end to the under side of the table over each of the said second ways, an anti-friction roller mounted in each lever and adapted to roll on its adjacent way, a spring between the table and the other ends of each pair of levers for transmitting a portion of the weight of the table to the rollers, and means operative from beneath the table for varying the action of the springs on the levers whereby to vary the amount of table weight transmitted to the rollers.

4. In a machine of the class described, the combination of a base, a pair of ways thereon, a work table slidable on the ways, a plurality of anti-friction rollers operatively connected to the table and adapted to roll on the base, spring means cooperating with the table and rollers for transmitting a portion of the weight of the table to the said rollers, a wedge operative beneath the table for varying the action of the spring means on the rollers whereby to vary the amount of the table weight transmitted to the rollers, and means for operating the wedge.

5. In a machine of the class described, the combination of a base, a pair of ways thereon, a work table slidable on the ways, a plurality of levers pivoted at one end to the under side of the table, an anti-friction roller mounted in each lever and adapted to roll on the base, spring means between the other ends of the levers and the table for transmitting a portion of the weight of the table to the said rollers, a wedge slidable between the spring means and the table for varying the action of the spring means on the levers, and means for sliding the wedge.

6. In a profiling machine, the combination of a base, a work table thereon, a cross rail supported horizontally on the base over the table, a tool support slidable horizontally on the cross rail, a tool spindle on the support, a rod extending along the rail and operatively connected to the spindle to move the same vertically, and a handle on the rod at the end of the rail for rotating the rod to move the spindle vertically.

7. In a profiling machine, the combination of a base, a work table thereon, a cross rail supported on the base over the table, a pair of tool supports slidably mounted on the rail, a tool spindle on each support, a pair of rods extending along the rail and operatively connected respectively to the said spindles for moving the same vertically, and a handle on each rod at the end of the rail for rotating the rods to move the spindles vertically.

8. In a profiling machine, the combination of a base, a work table thereon, a cross rail supported on the base over the table, a tool support slidably mounted on the cross rail, a tool spindle on the support, a rod extending along the rail and provided with a plurality of pairs of radially extending stops thereon, and means on the support for engaging the stops to limit the movement of the support on the rail, the rod being rotatable to bring any pair of the stops into cooperating relation with the said means.

9. In a profiling machine, the combination of a base, a work table thereon, a cross rail supported on the base over the table, a plurality of tool supports slidably mounted on the cross rail, a tool spindle on each support, a rod extending along the rail and provided with a plurality of pairs of radially extending stops thereon, and means on each support for engaging the stops to limit the movement of the support on the rail, the said means being movable into and out of stop engaging position and the rod being rotatable to bring any pair of the stops into cooperating relation with the said means.

10. In a profiling machine, the combination of a base, a work table slidably mounted on ways thereon, a rod extending parallel with the ways, a pair of adjustable stops on the rod, and a lug on the table adapted to engage the stops whereby to limit the movement of the table, the rod being rotatable to bring the stops into or out of the path of movement of the said lug.

11. In a profiling machine, the combination of a base, a work table slidably mounted on ways thereon, a rod extending parallel with the ways, a pair of adjustable stops on the rod, a lug on the table adapted to engage the stops whereby to limit the movement of the table, the rod being rotatable to bring the stops into or out of the path of movement of the said lug, and a spring-pressed detent for holding the rod either in or out of its operative position.

12. In a profiling machine, the combination of a base, a work table thereon, a cross rail supported on the base over the table, a tool support slidably mounted on the cross rail, a tool spindle on the support, a rod extending along the rail and provided with a pair of adjustable stops thereon, means on the support for engaging the stops to limit the movement of the support on the rail, a rod extending along the work table and provided with a pair of adjustable stops thereon, and a lug on the table adapted to engage the stops whereby to limit the movement of the table.

13. In a profiling machine, the combination of a base, a work table thereon, a cross rail supported on the base over the table, a tool support slidably mounted on the cross rail, a tool spindle on the support, a rod extending along the rail and provided with a pair of radially extending adjustable stops thereon, means on the support for engaging the stops to limit the movement of the support on the rail, a rod extending along the work table and provided with a pair of radially extending adjustable stops thereon, and a lug on the table adapted to engage the stops whereby to limit the movement of the table, both of the said rods being rotatable to bring the stops thereon into or out of operative position.

14. In a profiling machine, the combination of a base, a work table thereon, a cross rail supported on the base over the table, a tool support slidably mounted on the cross rail, a tool spindle on the support, a rod extending along the rail, a rod extending along the work table, both said rods being provided with a plurality of stops thereon and one rod being provided with a plurality of pairs of stops thereon, and means on the support and work table for respectively engaging the stops on the adjacent rod for limiting the movement of the support and table, both rods being rotatable to move the stops into or out of operative position and the said one rod being rotatable to bring any pair of the stops thereon into cooperating relation with the said means on the support.

15. In a profiling machine, the combination of a base, a work table thereon, a cross rail supported on the base over the table, a plurality of tool supports slidably mounted on the rail, a tool spindle on each support, a screw extending along the rail and threadedly connected to one support, a nut journaled in the adjacent support and threadedly engaging the screw, and means for securing the nut against rotation either relative to the support or to the screw.

16. In a profiling machine, the combination of a base, a work table thereon, a cross rail supported on the base over the table, a tool support slidably mounted on the cross rail, a tool spindle on the support, a screw extending along the rail and threadedly connected to the support, a horizontally extending shaft beneath the table, a vertical shaft and gearing operatively connecting the rear end of the horizontal shaft with one end of the screw, and a handle on the forward end of the horizontal shaft at the front of the machine whereby the screw may be rotated to move the support along the rail.

17. In a profiling machine, the combination of a base, a work table slidably mounted thereon, means including a handle at the operator's side of the table for moving the table, a cross rail supported on the base over the table, a tool support slidable on the rail at right angles to the table movement, a tool spindle on the support, a screw extending along the rail and threadedly connected to the support, and means including a handle at the said side of the table and adjacent the table operating handle for rotating the screw to move the support along the rail.

18. In a profiling machine, the combination of a base, a work table thereon, a cross rail supported on the base over the table, a tool support slidably mounted on the cross rail, a tool spindle on the support, rotary means extending along the rail and operatively connected to the spindle to drive the same in any position along the rail, a shaft adjacent the said rotary means, means including change gears operatively connecting the shaft to the rotary means, a pulley on the shaft, and a motor in the base adapted to drive the pulley.

19. In a profiling machine, the combination of a base, a work table thereon, a cross rail supported on the base over the table, a tool support slidably mounted on the cross rail, a tool spindle on the support, a shaft extending along the rail, gearing operatively connected to the spindle and splined to the shaft, a motor in the base, and means including change speed mechanism operatively connecting the motor to the shaft.

20. In a profiling machine, the combination of a base, a work table thereon, a cross rail supported on the base over the table, a tool support slidably mounted on the cross rail, a tool spindle on the support, a shaft extending along the rail, gearing operatively connected to the spindle and splined to the shaft, a shaft at the rear of the first mentioned shaft, means operatively connecting the two shafts, and a pulley on the second mentioned shaft, the said pulley being so positioned that the same may be driven either from a motor in the base or from an overhead countershaft.

21. In a profiling machine, the combination of a base, a work table slidably mounted thereon, a pair of uprights on the base respectively at opposite sides of the table, one of said uprights being hollow, a cross rail supported on the uprights over the table, a tool support slidably mounted on the rail, a tool spindle on the support, a shaft supported on the uprights and operatively connected to the spindle, a motor in the base, and means extending upwardly through the hollow upright and operatively connecting the motor with the shaft.

22. In a profiling machine, the combination of a base, a work table slidably mounted thereon, a pair of hollow uprights on the base respectively at opposite sides of the table, a cross rail supported on the uprights over the table, a tool support slidably mounted on the rail, a tool spindle on the support, a shaft supported on the uprights and operatively connected to the spindle, a motor and a lubricating pump in the base, means extending upwardly through one upright and operatively connecting the motor with the said shaft, and means extending downwardly through the other upright and operatively connecting the shaft with the said pump.

23. In a profiling machine, the combination of a base, a work table slidably mounted thereon, a pair of hollow uprights on the base respectively at opposite sides of the table, a cross rail supported on the uprights over the table, a tool support slidably mounted on the rail, a tool spindle on the support, a shaft supported on the uprights and operatively connected to the spindle, a pair of pulleys on opposite ends of the shaft, a motor and a lubricating pump in the base, a belt extending upwardly through one upright and operatively connecting the motor with one pulley, and a belt extending downwardly through the other upright and operatively connecting the other pulley with the said pump.

24. In a machine of the class described, the combination of a support, parallel ways on the support, a carriage slidable along the ways, a screw extending parallel with the ways and operatively connected to the carriage, a system of shafting including bevel gears for rotating the screw to move the carriage along the ways, and means for adjusting certain of the bevel gears axially for taking up looseness in the said system.

25. In a machine of the class described, the combination of a support, parallel ways on the support, a carriage slidable on the said ways, and means including a system of shafting operatively connected to the carriage for moving the same along the ways, the said means including a plurality of bevel gears and one of such gears having screw threaded means adjacent opposite ends thereof for adjusting the gear axially to take up looseness in the said system.

26. In a machine of the class described, the combination of a support, parallel ways on the support, a carriage slidable on the said ways, a screw extending parallel with the ways, a nut threadedly engaging the screw and operatively connected to the carriage for movement laterally of the screw relative to a carriage but held against movement longitudinally of the screw relative to the carriage, and means for rotating the screw to move the carriage along its ways.

27. In a machine of the class described, the combination of a support, horizontal ways thereon, a carriage slidable on the said ways, a screw extending parallel with the ways, a nut threadedly engaging the screw and operatively connected to the carriage for free vertical and horizontal movements but held against movement relative thereto longitudinally of the screw, and means for rotating the screw to move the carriage along its ways.

28. In a machine of the class described, the combination of a support, horizontal ways thereon, a carriage slidable on the said ways, a screw parallel with and between the ways, a pair of spaced elements secured to and extending downwardly from the carriage, a nut threadedly engaging the screw and supported between the said elements for free vertical and horizontal movements but held against movement relative thereto longitudinally of the screw, and means for rotating the screw to move the carriage along its ways.

In testimony whereof, I hereto affix my signature.

JERRY J. LA DUCER.